UNITED STATES PATENT OFFICE.

JOSEF ZIEGLER, OF HAMBURG, GERMANY, ASSIGNOR TO FRANZ FRITZSCHE & CO., OF SAME PLACE.

SYNTHETIC VIOLET OIL AND PROCESS OF MAKING SAME.

SPECIFICATION forming part of Letters Patent No. 626,585, dated June 6, 1899.

Application filed December 31, 1897. Serial No. 665,182. (Specimens.)

*To all whom it may concern:*

Be it known that I, JOSEF ZIEGLER, doctor of philosophy, a subject of the Emperor of Germany, residing at Hamburg-Uhlenhorst, Germany, have invented new and useful Improvements in Processes for the Manufacture of Artificial Oil of Violets and Products Thereof, of which the following is a specification.

My invention relates to a process of manufacturing hitherto-unknown oils having the odor of violets and to the product of said process.

The object of my invention is to produce essential oils having the odor of violets in an economical manner; and my invention consists in the process of manufacturing such oils and in the oils themselves, as hereinafter described and claimed. I accomplish this result in the following manner: A mixture of forty-five kilograms of acetone, thirty-eight kilograms of lemon-grass oil, seventy-five kilograms of alcohol, seventy-five kilograms of a concentrated neutral solution of chlorid of lime, ($CaOCl_2$,) and a little cobaltous nitrate (thirty grams) dissolved in water is boiled from one to eighteen hours at a temperature of from 70° to 80° centigrade in an apparatus having a reflux cooling attachment applied thereto. The proportions given above can be varied, however, within considerable limits. Instead of chlorid of lime other hypo-chlorous salts may be used. The cobaltous nitrate may be omitted, if desired. Its presence is not indispensable, although I prefer to use it. After this the alcohol and excess of acetone are first distilled off, and then about four kilograms of the lighter products, which have a specific gravity of 0.88, are distilled off and the essential oil is obtained, from which the artificial oil of violets is made. This essential oil boils at from 155° to 175° centigrade at twelve-millimeter pressure, and the mixture given above will produce about twenty-five kilograms of such essential oil. This oil is then heated at about 110° centigrade with a solution of bisulfate of sodium of 11° Baumé (forty-two kilograms for three hundred and sixty liters of water) in a vessel provided with a mixing device until the samples distilled are free from any unpleasant smell and until they reach a specific gravity of about 0.939. This happens after about eight days and the part distilled off is about eight kilograms. The crude product thus obtained (about seventeen kilograms) in the vessel is then purified by fractional distillation until every trace of the bad-smelling portions have been removed. Finally there remains an oil of a specific gravity varying from 0.948 to 0.952 centigrade, boiling at from 138° to 149° centigrade under twelve-millimeter pressure. The larger portion of this oil and that which has the strongest and pleasantest smell boils at 149° centigrade.

If the process has been properly carried on, the resulting oil will have a specific gravity of very nearly 0.950. This oil differs from ionone by having when concentrated a very strong odor, similar to that of sandalwood, by producing a left-handed rotation of a polarized ray of light, and by having when diluted an odor much more closely approaching the odor of natural violets than does that of ionone. Analysis shows that this oil consists of several ketones of the group $C_{13}H_{20}O$, all of which ketones have a high boiling-point and greater density than those of ionone. The existence of these ketones and their artificial production have hitherto been unknown. This production can be manufactured in a much more simple and economical manner than can ionone or pseudo-ionone, and its odor is much more like the odor of real violets than is either ionone or pseudo-ionone. Moreover, the odor is much more constant than that of those substances, as it is less volatile. It is obvious that it is much more suitable for making an artificial perfume having the odor of violets.

Having thus described my invention, what I claim, and desire to secure by Letters Patent of the United States, is—

1. As a new article of manufacture, an essential oil having the odor of violets, boiling at from 138° to 149° centigrade under a pressure of twelve millimeters having a specific gravity of from 0.94 to 0.96 at 15° centigrade, and having an index of refraction varying from 1.509 to 1.515 at 20° centigrade, which index increases at decreasing temperatures, substantially as described.

2. The process of obtaining an intermediate product to be used in the manufacture of oils having the odor of violets, which process consists in mixing together acetone, lemon-grass oil, alcohol and chlorid of lime, heating the mixture, causing the volatile products to be returned to the mixture for a time, and distilling off the lighter and bad-smelling portions, substantially as described.

3. The process of manufacturing essential oils, which consists in mixing together acetone, lemon-grass oil, alcohol, chlorid of lime, and cobaltous nitrate, heating the mixture, causing the volatile products to be returned for a time to the mixture, and distilling off the lighter and bad-smelling portions, substantially as described.

4. The process of manufacturing essential oils having the odor of violets, which consists in producing oils of a comparatively high boiling-point by heating a mixture of acetone, lemon-grass oil, alcohol cobaltous nitrate and chlorid of lime, distilling off the lighter and bad-smelling portions, distilling off the essential oils, mixing these oils with bisulfate of sodium, heating said mixture and fractionally distilling it, substantially as described.

In testimony whereof I have signed my name to this specification in the presence of two subscribing witnesses.

JOSEF ZIEGLER.

Witnesses:
JOSEF SUTER,
E. H. MUMMENHOFF.